(12) United States Patent
Thacker

(10) Patent No.: US 8,393,439 B2
(45) Date of Patent: Mar. 12, 2013

(54) SCAFFOLD SYSTEM AND METHOD

(76) Inventor: Steve Howard Thacker, McKinney, TX (US)

( * ) Notice: Subject to any disclaimer, the term of this patent is extended or adjusted under 35 U.S.C. 154(b) by 164 days.

(21) Appl. No.: 12/930,921

(22) Filed: Jan. 20, 2011

(65) Prior Publication Data
US 2011/0180350 A1   Jul. 28, 2011

Related U.S. Application Data

(60) Provisional application No. 61/337,156, filed on Jan. 26, 2010, provisional application No. 61/343,087, filed on Apr. 23, 2010.

(51) Int. Cl.
*E04G 7/32* (2006.01)
(52) U.S. Cl. ........................ 182/186.8; 403/49
(58) Field of Classification Search ............... 182/186.7, 182/186.8; 403/49
See application file for complete search history.

(56) References Cited

U.S. PATENT DOCUMENTS

| | | | |
|---|---|---|---|
| 4,039,264 A * | 8/1977 | Sharp | 403/246 |
| 4,405,254 A * | 9/1983 | Tooley | 403/246 |
| 4,493,578 A * | 1/1985 | D'Alessio | 403/49 |
| 4,840,513 A * | 6/1989 | Hackett | 403/49 |
| 5,024,037 A * | 6/1991 | Ono | 52/646 |
| 5,605,204 A * | 2/1997 | Ausejo | 182/186.7 |
| 5,858,223 A * | 1/1999 | Stadtmuller et al. | 210/222 |
| 6,027,276 A * | 2/2000 | Schworer | 403/49 |

FOREIGN PATENT DOCUMENTS

JP    08-082092 A    3/1996

OTHER PUBLICATIONS

International Search Report and Written Opinion for PCT Application No. PCT/US2011/022629, dated Jul. 29, 2011, pp. 1-7.

* cited by examiner

*Primary Examiner* — Alvin Chin Shue

(57) ABSTRACT

A scaffold system and method having a hollow horizontal member with an internal wedge head at each end thereof, and internal wedge assembly with an external handle, and a vertical member having affixed in coaxial alignment therewith at least one grid patterned rosette. Each internal wedge head at the end of the horizontal member is configured to couple to the grid patterned rosette coupled to the vertical member substantially simultaneously using the wedge assembly mechanism.

7 Claims, 12 Drawing Sheets

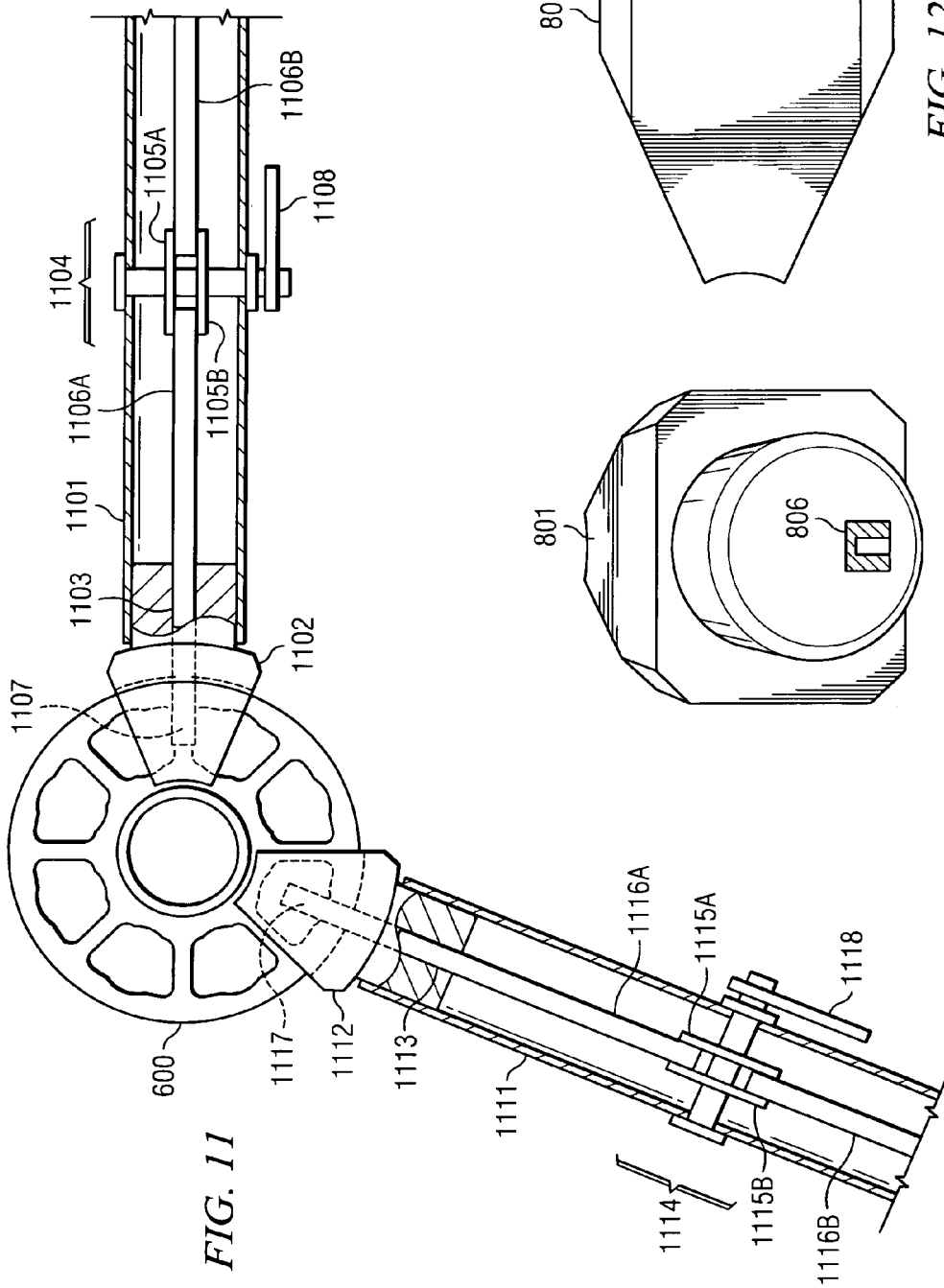

SCAFFOLD SYSTEM AND METHOD

CROSS REFERENCE TO RELATED APPLICATIONS

This application claims the benefit of U.S. Provisional Application No. 61/337,156 filed on Jan. 26, 2010, entitled "GRIDLOCK SCAFFOLD APPARATUS AND METHOD" and U.S. Provisional Application No. 61/343,087 filed on Apr. 23, 2010, entitled "HYBRID SCAFFOLD SYSTEM".

FIELD OF THE INVENTION

This invention relates to modular scaffolding systems that are erected as impermanent structures to support platforms. Scaffolding is used, inter alia, in the industrial, commercial, petro-chemical, power source, general industry and residential construction markets.

BACKGROUND

In 2008, the Bureau of Labor Statistics' Census of Fatal Occupational Injuries (CFOI) reported 88 fatalities occurred in the year 2007 related to the use of scaffolds and many more injuries. Twenty-seven percent (27%) of the fatalities and many of the injuries involved falls off of welded frame scaffolds over 25 feet high during the installation of the scaffolds. Safety officials recommend that scaffolding falls be preempted through the use of sequential erection techniques. This involves installing guardrails and standards at regular distances along the scaffold such that the exposed platform edge is not greater than a bay length between intervals. The use of safety harnesses or belts tethered to guardrails during the erection process is also a recommended safety practice. However, the use safety harnesses to deter fall injuries during scaffold erection is quite limited due to the components used in conventional scaffolds. The nature and design of conventional scaffold components, as described herein, disadvantageously do not allow the effective use of safety harnesses during the erection process.

Tube and coupler scaffolds are so-named because they are built from tubing connected by coupling devices. Due to their strength, they are frequently used where heavy loads need to be carried, or where multiple platforms must reach several stories high. Components of scaffolds include vertical standards having coupling rings or rosettes, horizontal components such as ledgers and guardrails coupled to the coupling rings or rosettes, footings, decks/platforms and diagonal braces. Their versatility, which enables them to be assembled in multiple directions in a variety of settings, also makes them difficult to build correctly.

Conventional scaffolding systems have various components. FIG. 1 illustrates a supported scaffold 100 consisting of one or more platforms supported by rigid support members such as poles, tubes, beams, brackets, posts, frames and the like. More specifically, the supported scaffold 100 includes the following components: deck/platform 101, horizontal members, or ledgers 102, vertical standards 103. Additional components include diagonal braces to increase the stiffness and rigidity of the scaffold 100.

FIG. 2 is an illustration of a vertical standard 103. Vertical standards are typically cylindrical tubes 200 comprised of hot-dip galvanized steel or aluminum. A collar with an expanded or reduced diameter or a spigot at either or both ends of the vertical standard facilitates the joining of vertical standards from end to end. Rosettes 201 are positioned and then welded or otherwise attached along the tubes providing connections for horizontal members and diagonal braces. The vertical standard can have from one to 8 or more rosettes placed along the tubing using a predetermined spacing between rosettes, for example, about every 20 inches.

FIG. 3 illustrates a ledger 102. A ledger is a horizontal member that serves as both a guardrail and bracing element. The ledger 102 is comprised of tubing 300, heads 301 and wedges 302. Ledgers 102 are available in different lengths, depending on the scaffolding bay length, deck type and load. It is the conventional manner in which these ledgers are coupled to vertical standards that contribute to scaffolding falls as further described herein. Once the tubing on a level is installed, decks or platforms 101 made of, e.g., hot-dip galvanized steel, aluminum, wood or an aluminum frame with plywood board are installed to allow workers to traverse the scaffold 100 and install the guardrails (e.g., ledgers 102).

Referring now to FIG. 4, wedge 302 is shown being hammered into the slot or gap of head 301 at the end of a ledger 102 so as to couple it to the rosette 201 of the vertical standard 200. This must be done by a worker first at the proximate end of the ledger 102 and then at the distal end of the ledger 102. However, as the proximate end of the ledger 102 is being coupled to the vertical standard using the wedge 302, the distal end of the ledger 102 is free and uncoupled, that is, until the worker can traverse the platform to the distal end of the ledger 102 and hammer in a wedge 302 at the distal end. During this time, the distal end of the ledger 102 remains uncoupled from the vertical standard. Hence, if the installer is harnessed to the ledger 102 and the scaffold tilts toward the uncoupled, distal end, the installer may tumble down the platform and the safety harness will exit the uncoupled end of the ledger, providing no measure of safety to the installer.

A conventional rosette 500, as seen in FIG. 5, has a central aperture 503 to receive the vertical tubing, four small openings 501A-D to facilitate right-angled connections and four larger openings 502 A-D to facilitate connections at any angles. Typically, a vertically and horizontally slotted head 504 coupled to the end of a ledger is positioned with respect to the rosette 500 such that the horizontal slot of the head 504 is positioned over and under the rosette 500 and the vertical slot of the head is aligned with an aperture of the rosette 500. A wedge 302 is then hammered into the vertical slot (or gap) to couple the ledger 102 via the head 504 to the vertical standard 103 via the rosette 500 using, inter alia, frictional force. Note that, disadvantageously, until the wedge 302 is installed, there is significant play between the rosette 500 and head of a horizontal member giving rise to safety concerns. Furthermore, once installed, wedges often work free when workers traverse the platform. When these wedges work free, the scaffold can become unstable and collapse. Further, even if the scaffold does not collapse, steel wedges, which, as seen in the Figure, are not integrated into the head or the ledger, can fall from the scaffold injuring workers below.

What is desired is a scaffolding apparatus and method that is configured to couple both ends of a ledger (also referred to herein as a horizontal member) to a vertical standard (also referred to herein as a vertical member) simultaneously, and which has an internal wedge assembly mechanism that allows a single installer to insert and lock wedges at both ends of the horizontal member substantially simultaneously to the vertical standard. The invention provides such an apparatus and method.

SUMMARY

The invention comprises a scaffold apparatus and method that overcomes the safety, rigidity, and labor issues inherent in conventional scaffold systems. The ring, collar, rosette or component with similar functionality, is referred to as a rosette with respect to the invention; the vertical standard or component with similar functionality, is referred to as a vertical member with respect to the invention and the ledger, guardrail or component with similar functionality is referred to as a horizontal member. The use of the foregoing terms is not to be interpreted as limiting the scope of the invention.

As noted herein, components of the invention include at least one horizontal member, preferably having an internal wedge head at each end thereof, at least one vertical member including at least one rosette positioned thereon in coaxial alignment with the vertical member, the rosette having apertures for receiving mating elements, or prongs, of an internal wedge head, an internal wedge assembly within the horizontal member, the internal wedge assembly having a first rod with a wedge portion at a first end thereof, the first rod being coupled at a second end thereof to an internal crank/cam assembly, an external handle coupled to a crank axle of the internal crank/cam assembly, the internal wedge assembly further having a second rod with a wedge portion at a first end thereof, the second rod being coupled at a second end thereof to the internal crank/cam assembly, each of the internal wedge heads having at least one or a plurality of mating elements or prongs dimensioned to fit within a grid of apertures formed in the rosette, the internal wedge head having a bore through which the wedge portion wholly or partially extends to lock the internal wedge head, and hence, the horizontal member to the rosette and wholly or partially retracts to unlock the internal wedge head, and hence, the horizontal member from the rosette.

To those skilled in the art to which this invention relates, many changes in construction and widely differing embodiments and applications of the invention will suggest themselves without departing from the scope of the invention as defined herein and in the appended claims. The disclosures and the descriptions herein are purely illustrative and are not intended to be in any sense limiting.

DESCRIPTION OF THE DRAWINGS

A more complete understanding of the invention may be obtained by reference to the following Detailed Description, when taken in conjunction with the accompanying Drawings, wherein:

FIG. 11 is a bottom, cutaway view of a pair of horizontal members and corresponding internal wedge heads showing an embodiment of the wedge assembly and crank/cam assembly of the invention;

FIG. 12A is a view of the back end of an internal wedge head showing the wedge bore and FIG. 12B is a top view of an internal wedge head;

DETAILED DESCRIPTION

The invention comprises a modular scaffold system that overcomes the safety, rigidity, and labor issues inherent in conventional scaffold systems. The ring, collar, rosette or component with similar functionality, is referred to as a rosette with respect to the invention; the vertical standard or component with similar functionality, is referred to as a vertical member with respect to the invention and the ledger, guardrail or component with similar functionality is referred to as a horizontal member. The use of the foregoing terms is not to be interpreted as limiting the scope of the invention.

As noted herein, components of the invention include at least one horizontal member which horizontal member preferably has an internal wedge head at each end thereof, at least one vertical member including at least one rosette affixed in coaxial alignment thereon, the rosette having apertures for receiving mating elements or prongs of an internal wedge head (which may be a separate component of the horizontal member, or an integrated portion at the end of the horizontal member), an internal wedge assembly within the horizontal member, the internal wedge assembly having a first rod with a wedge portion at a first end thereof, the first rod being coupled at a second end thereof to an internal crank/cam assembly, an external handle coupled to a crank axle of the internal crank/cam assembly, the internal wedge assembly further having a second rod with a wedge portion at a first end thereof, the second rod being coupled at a second end thereof to the internal crank/cam assembly, each of the internal wedge heads having a plurality of prongs dimensioned to fit within a grid of apertures formed in the rosette, the internal wedge head having a bore through which the wedge portion extends wholly or partially out of the internal wedge head to lock the internal wedge head, and hence, the horizontal member to the rosette An aspect of the invention is a joint for use in coupling a horizontal member to a vertical member, comprising a rosette having a set of radially arranged cut-outs, a horizontal member further comprising a hollow tube having contained therein an internal wedge assembly, the internal wedge assembly having a wedge portion at the end thereof which is wholly or partially extendable and retractable into the hollow tube of an internal wedge head and/or horizontal member, the internal wedge head, or an end of the horizontal member, having mating elements corresponding to the radially arranged cut-outs of the rosette, wherein, when the mating elements of internal wedge head or the horizontal member are received in the radially arranged cut-outs of the rosette, the internal wedge assembly, when actuated, causes the wedge portion to rigidly join the internal wedge head or horizontal member to the rosette.

Figure 1:
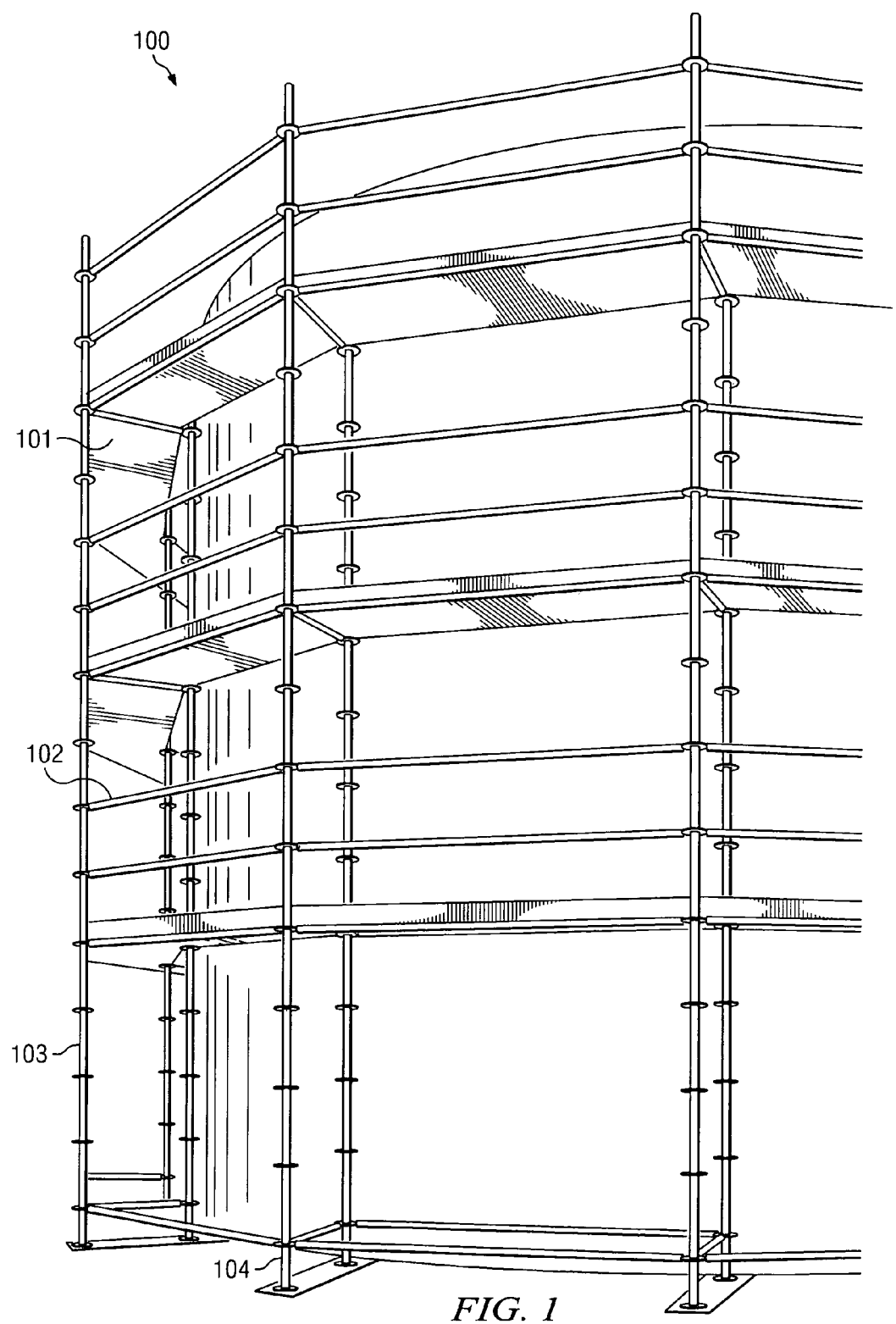
FIG. 1 illustrates a scaffold structure.
Figures 2, 3:
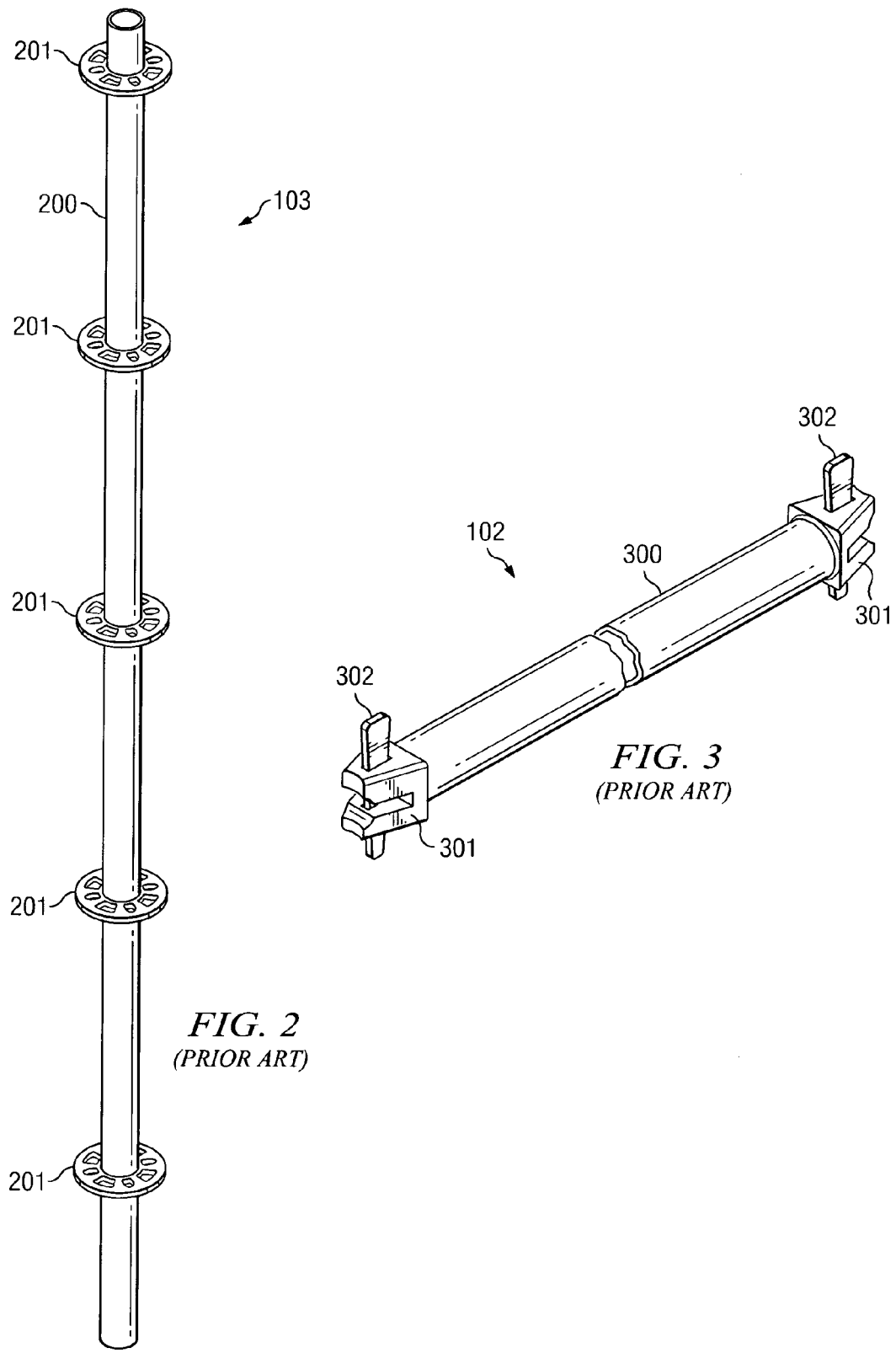
FIG. 2 illustrates a vertical standard.
FIG. 3 illustrates a conventional ledger with unsecured wedges.
Figures 4, 5:
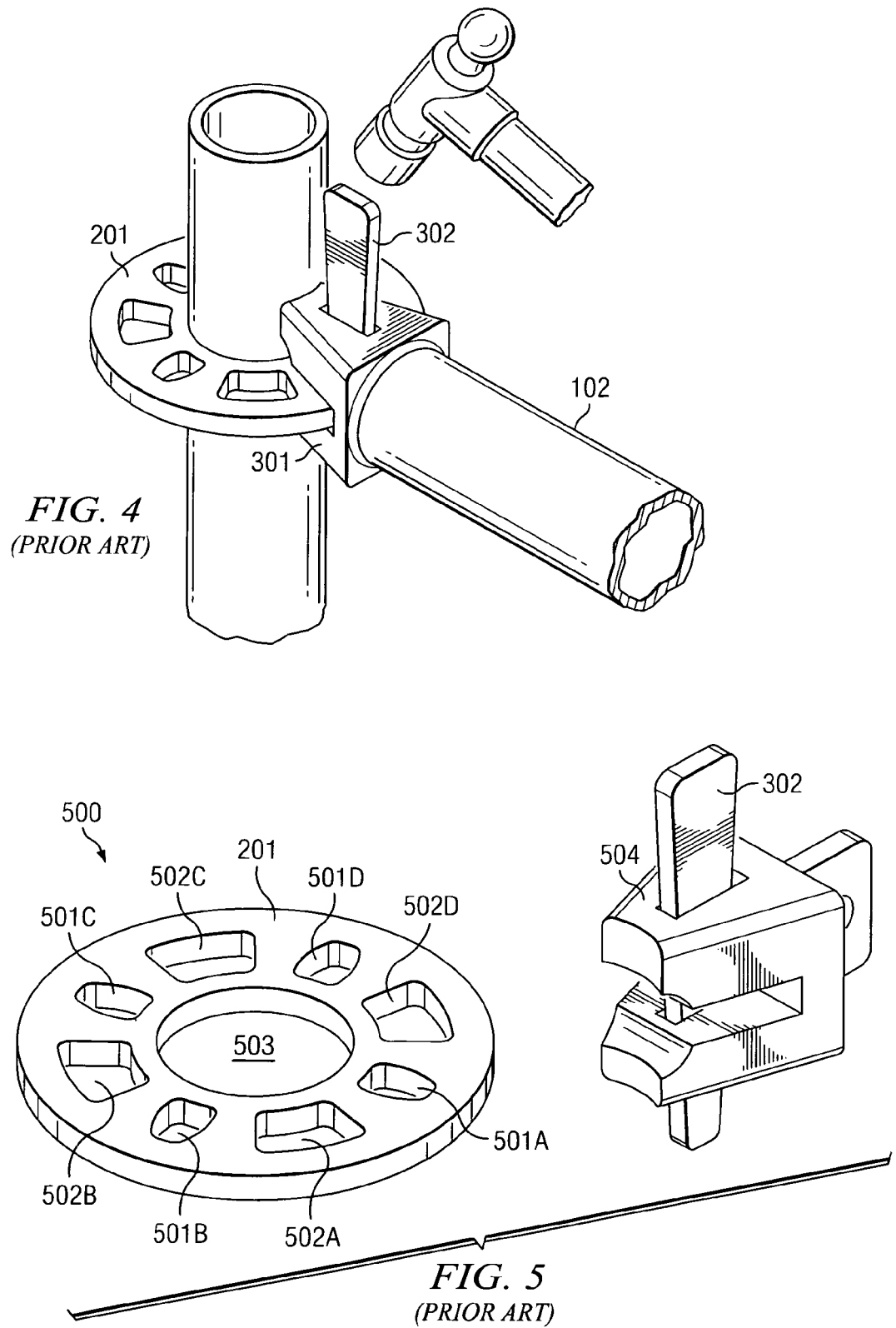
FIG. 4 illustrates the installation of an unsecured wedge into a conventional ledger head.
FIG. 5 illustrates a rosette and conventional head and wedge.
Figure 6:
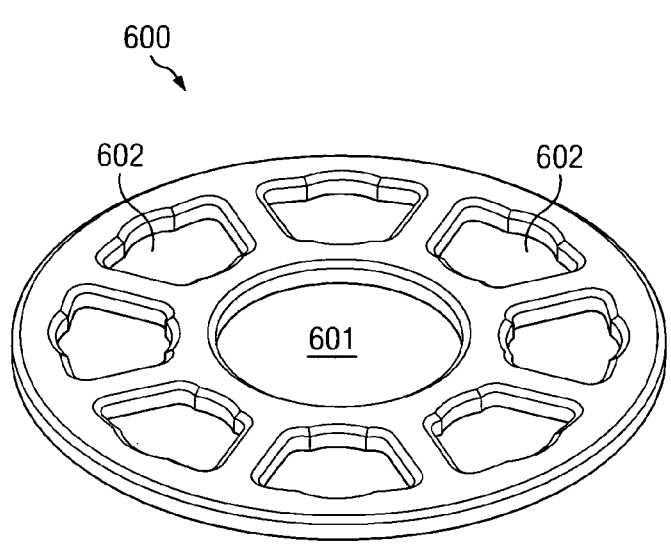
FIG. 6 is one embodiment of a rosette of the invention.

Referring now to FIG. 6, the top view of one embodiment of a rosette 600 of the invention is shown. An embodiment of rosette 600 is circular in shape and has a breadth or extent. Such breadth or extent may be any measure appropriate to allow the internal wedge head to engage the rosette 600 as more fully described herein. Rosette 600 has a central aperture 601 or cut-out in a substantially circular shape dimensioned to receive the vertical tubing of the vertical member. In another aspect, such central aperture or cut-out may be any shape that corresponds to the cross-sectional shape of a vertical member. Once placed on the vertical tubing, rosette 600 can thus be welded or otherwise attached in a co-axial alignment with the vertical tubing of the vertical member. A plurality of rosettes can thus positioned and affixed along the length of the vertical tubing. Between the outer circumference of rosette 600 and the outer circumference of the central aperture 601 are a plurality of radially arranged cut-outs 602 for receiving prongs of at least one internal wedge head as further described herein. The grid arrangement of the radially arranged cut-outs 602 allow for the flexible arrangement of horizontal members to the vertical member via rosette 600. As seen in FIG. 6, eight (8) radially arranged cut-outs are shown, although a different number of radially arranged cut-outs can be arranged on rosette 600. In an embodiment of the invention, the radially arranged cut-outs 602 generally comprise trapezoids with inner and outer edges having circular arcs of concentric circles of different radii. The intersections of the line segments and arcs can be filleted, comprising a concave easing of the interior corners to reduce stress concentration. On a portion of, and further cut out from, the inner and outer edges of such trapezoids are arc shaped notches comprising a portion of a circle centered on the trapezoid. The edges of intersection of each of the upper and lower surfaces of the rosette with the vertical, interior walls of the rosette can be rounded, beveled or chamfered. The radially arranged cut-outs 602 are dimensioned to receive the descending, vertical prongs of the internal wedge head.

Figure 7:
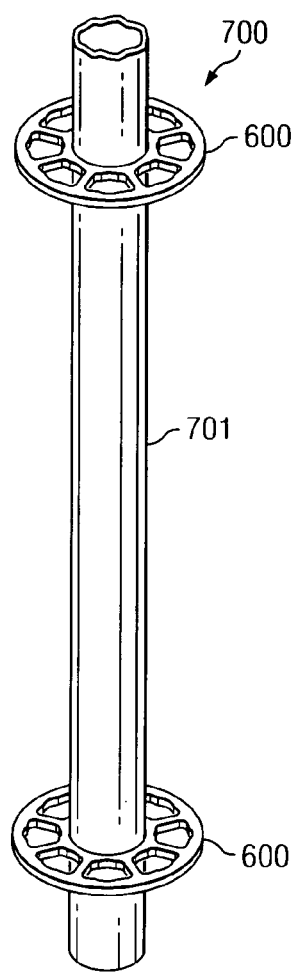
FIG. 7 is one embodiment of a vertical member of the invention.

FIG. 7 is one embodiment of a vertical member 700 of the invention having a plurality of rosettes 600 positioned and affixed in coaxial alignment on vertical tubing 701.

Figure 8:
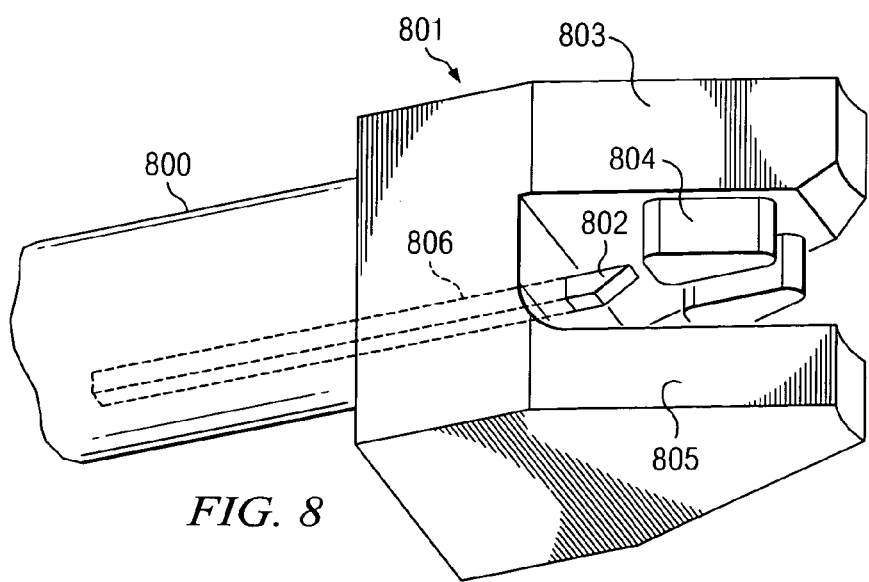
FIG. 8 is one embodiment of a horizontal member and internal wedge head of the invention.

FIG. 8 is one embodiment of a horizontal member 800 and internal wedge head 801 of the invention wherein the internal wedge head 801 is coupled to the first end of horizontal member 800. Internal wedge head 801 further comprises a plurality of surfaces and edges forming a polyhedron including extensions or prongs. One aspect of internal wedge head 801 has main body 802 with a top surface, bottom surface, left surface, front surface, right surface and back surface, with edges corresponding to the plurality of surface. The planes of main body 802 left surface and right surface can be parallel to each other or angled with respect to each other. The planes of main body 802 top surface and bottom surface are substantially parallel to each other. Alternative shapes and dimensions of the internal wedge head are within the scope of this invention.

A horizontal upper extension 803 extends from a top portion of the front surface of main body 802, the horizontal upper extension 803 having a respective top surface, bottom surface and left and right surfaces, a plurality of descending vertical prongs 804 (shown here as a pair of descending vertical prongs) descending from the bottom surface of the horizontal upper extension 803. In an embodiment of the invention, each vertical prong 802 extends between ¼ and ⅔ of the length from the edge joining the top surface and the front surface of main body 802 to the edge joining the bottom surface and the front surface of main body 802. A gap exists between a pair of vertical prongs 804 dimensioned so as to receive a portion of the rosette 600 between adjacent radially arranged cut-outs 602. The planes of horizontal upper extension 803 left surface and right surface can be parallel to each other or angled with respect to each other. The planes of horizontal upper extension 803 top surface and bottom surface are substantially parallel to each other. Alternative shapes and dimensions of the horizontal upper extension and prongs are within the scope of this invention.

Further extending from a bottom portion of the front surface of main body 802 is a lower jaw 805 having a left surface, front surface, right surface, top surface and bottom surface. The planes of lower jaw 805 left surface and right surface can be parallel to each other or angled with respect to each other. The planes of lower jaw 805 top surface and bottom surface are substantially parallel to each other. Alternative shapes and dimensions of the lower jaw are within the scope of this invention.

On the front surface of main body 802, located between horizontal upper extension 803 and lower jaw 805 is a bore opening corresponding to bore 806 which extends through the main body 802 from the back surface thereof to the front surface thereof. Bore 806 receives wedge portion of a wedge assembly as further described herein. Horizontal member 800 is fixedly coupled at a coupling joint proximate the back surface of main body 802.

Figure 9:
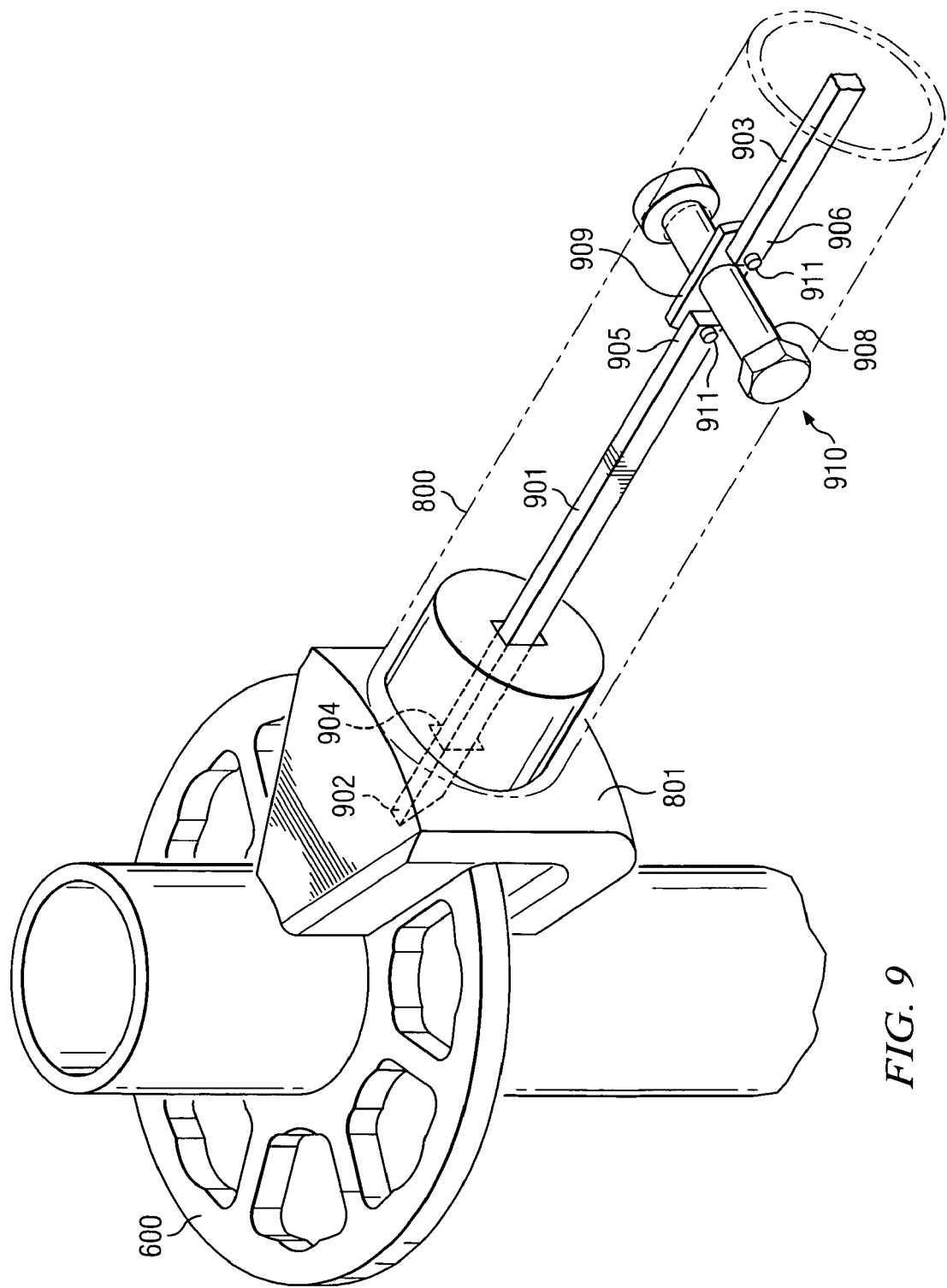
FIG. 9 is a cutaway view of a horizontal member and internal wedge head showing an embodiment of the wedge assembly and crank/cam assembly of the invention.

FIG. 9 is a cutaway view of horizontal member 800 and internal wedge head 801 showing an embodiment of the internal wedge assembly including the crank/cam assembly 910 of the invention. The horizontal member 800 is a hollow tube, preferably cylindrical in shape, having a first end and a second end. At the first end is internal wedge head 801 and a second internal wedge head (not shown) is also positioned at the second end. Within the horizontal member 800 of the invention is an internal wedge assembly. The wedge assembly has a first rod section 901 having a wedge portion 902 at the first end thereof 904 and a second rod section 903 having a corresponding wedge portion at the first end thereof (not shown). The crank/cam assembly 910 is located between the second end 905 of the first rod 901 and the second end 906 of the second rod 903. The first rod section 901 and second rod section 903 are preferably made of an alloy such as steel, iron or other resilient material and can be treated by a process, including galvanization or power coating.

The first rod section 901 and second rod section 903 can be equal in length, but are preferably unequal in length so that the handle of the crank/cam assembly 910 is offset, being closer toward one end of the horizontal member 800 as opposed to the other end. The second end 905 of the first rod section 901 and the second end 906 of the second rod section 903 each have a coupling means such as a rotating joint, for rotatably coupling the ends of the rods to end segments of a crank arm 909 of crank/cam assembly 910. Such coupling means includes a rotating joint formed by an aperture formed through the ends of each rod and corresponding aperture 911 in the crank arm 909 of the crank/cam assembly 910, the apertures dimensioned for receiving a coupler component, such as a bolt and a nut, a revolute, a pin, a rivet or the like. The coupler component may include washers, bushings, bearings or similar components so as to reduce the friction between the ends of the rod sections and the crank arm 909. Further, locking or latching mechanisms may also be incorporated into the crank/cam assembly so as to lock the crank/cam assembly and corresponding coupled components in a desired position.

Each such coupling means provides a rotation axis for each of the rods with respect to the crank arm 909. The second end of each rod can be directly coupled to the crank arm 909 or indirectly coupled having interposed thereinbetween an intermediate component made of a different material such as a different type of metal or plastic having a joining means, such as an hollowed cylindrical portion for receiving the second end of the rod and a revolution means, such as an aperture and bolt and nut, revolute, pin or rivet and associated washers, bushings and/or bearings for rotatably coupling the interposed component to the crank/cam arm. In the above described manner, the coupler components indirectly couple the second end 905 of the first rod 901 and the second end 906 of the second rod 903 together via the crank arm 909 of the crank/cam assembly 910 to a handle.

The crank/cam assembly 910 which is positioned within the tubing of horizontal member 800 comprises a rotatable crank axle 908, the ends of which are rotatably coupled to through the interior sides of horizontal member 800, which rotatable crank/cam axle 908 can be a cylindrical bolt, rivet, revolute or pin with associated washers, bushings and/or bearings, an end thereof extending out of horizontal member 800 orthogonally to the length of the horizontal member 800 so as to receive a handle (not shown) that responsively rotates the crank/cam axle 908 when actuated. In this manner, crank/cam axle 908 provides a rotation axis for the crank/cam arm 909.

Crank/cam arm 909 is rigidly coupled to crank/cam axle 908, the arm segments of crank/cam arm 909 extending outwardly from the central axis of crank/cam axle 908. Rotatably coupled to a first extended segment of crank/cam arm 909 is second end 905 of the first rod 901 and rotatably coupled to the second extended segment of crank/cam arm 909 is the second end 906 of the second rod 903. In this manner, when actuated, the rotational motion of the crank/cam axle 908 is translated, via the crank/cam arm 909 into substantially linear motion of the first end 904 of first rod 901 and first end (not shown) of second rod 903. Hence, when the handle is turned in a first direction (actuated), it simultaneously causes the wedge portion 902 of the first rod 901 and wedge portion of the second rod (not shown) to each wholly or partially extend out of the first end and second end, respectively of the horizontal member 800. When the handle is turned in an opposite direction (actuated), it simultaneously causes the wedge portion 902 of the first rod 901 and wedge portion of the second rod (not shown) to wholly or partially retract into the first end and second end, respectively of the horizontal member 800.

At the end of each horizontal member 800 is an internal wedge head 801 having a bore 806 through which the wedge portion 902 extends so as to engage under the lower planar surface of rosette 600 when the prongs 804 are received through the top of the rosette 600 in certain of the radially arranged cut-outs 602. In addition to preventing the horizontal member from being uplifted from the rosette 600, the wedge may also provide a frictional force against the rosette 600 to hold the horizontal member rigid with respect to the vertical member.

Crank/cam arm 909 can comprise a single arm having a first segment and a second segment which is offset 180 degrees from the first segment or, as seen in FIG. 11 or can comprise a pair of parallel, a positioned arms, each having a first segment and a second segment. Between the faces of the first segments of such pair of arms, toward the distal ends thereof, is positioned the second end of the first rod. Between the second segments of the pair of a positioned arms, toward the distal ends thereof, is positioned the second end of the second rod. Each of the second ends are rotatably coupled to their respective segments at a rotating joint comprising apertures through which a coupling component such as a bolt and nut, revolute, pin, rivet and associated washers, bushings and/or bearings and the like is inserted.

Although an embodiment of a crank mechanism is shown in FIG. 9, a cam, slider/slot, plunger, spring loaded or other similar mechanism can also be used in the internal wedge assembly to cause the extension of the internal wedge through the internal wedge head so as to lock the horizontal member into position with respect to the vertical members via the rosette. For example, a cam mechanism can be used to cause the extension of the first rod and second rod, the second ends of such rods being biased against the cam using a spring mechanism.

Figure 10:
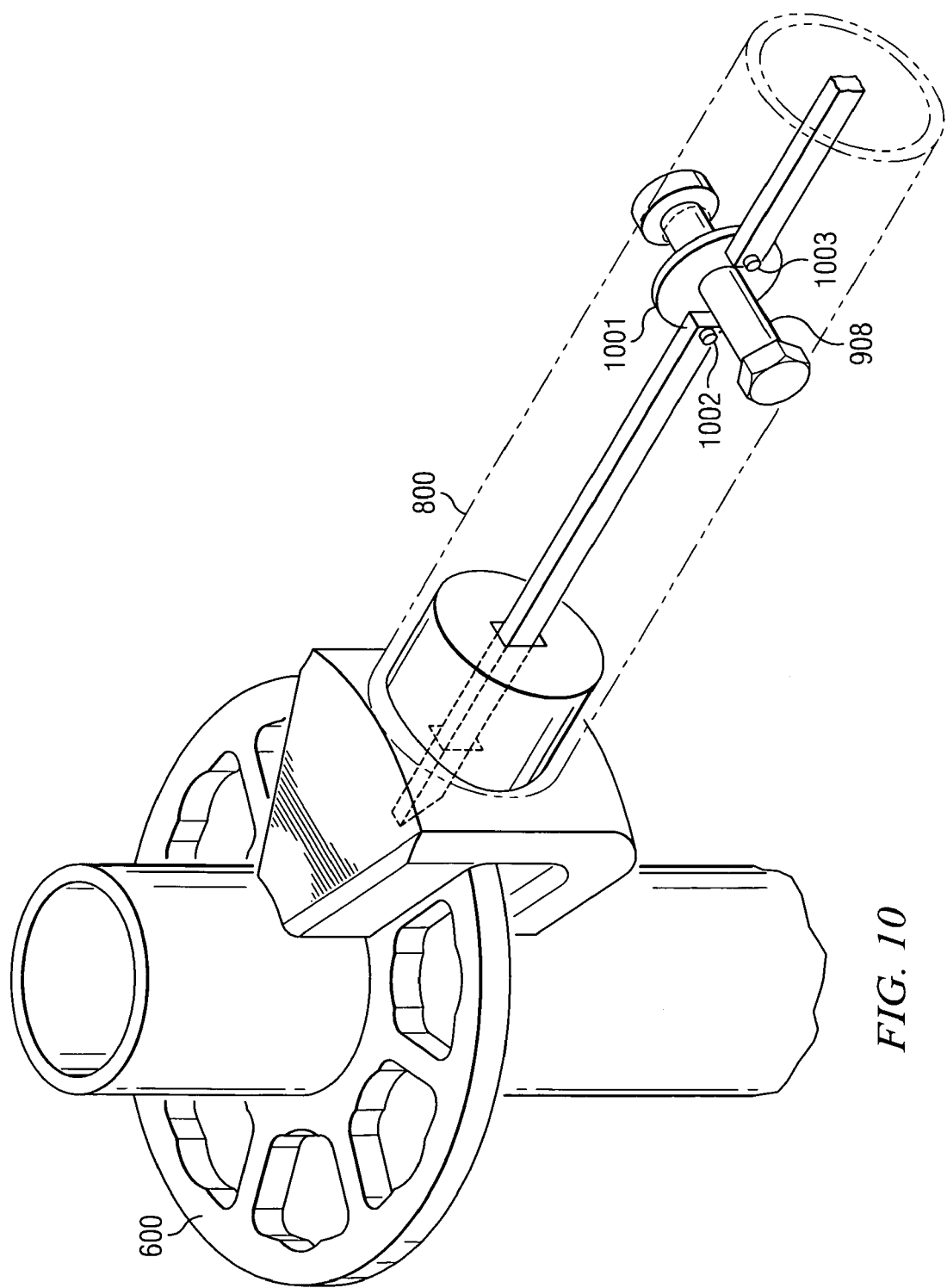
FIG. 10 is a cutaway view of a horizontal member and internal wedge head showing an embodiment of the wedge assembly and an alternative embodiment of a crank/cam assembly of the invention.

FIG. 10 is a cutaway view of a horizontal member and internal wedge head showing an embodiment of the wedge assembly and an alternative embodiment of a crank/cam assembly of the invention. As seen therein, crank/cam arm 909 is replaced with a crank/cam disk 1001 which is fixedly coupled to crank/cam axle 908. The central axis of the crank/cam axle 908 intersects the center of the crank/cam disk 1001. Rotatably coupled using a rotating joint in a first aperture 1002 in crank/cam disk 1001 is second end 905 of the first rod 901 and rotatably coupled using a rotating joint in a second aperture 1003 in crank/cam disk 1001 is the second end 906 of the second rod 903. In this manner, the rotational motion of the crank/cam axle 908 is translated, via the crank/cam disk 1001 into substantially linear motion of the first end 904 of first rod 901 and first end (not shown) of second rod 903. In this manner, when a handle rigidly coupled to the crank/cam axle 908 is turned in a first direction, it simultaneously causes the wedge portion 902 of the first rod 901 and wedge portion of the second rod (not shown) to each wholly or partially extend out of the first end and second end, respectively of the internal wedge head or horizontal member 800. When the handle is turned in an opposite direction, it simultaneously causes the wedge portion 902 of the first rod 901 and wedge portion of the second rod (not shown) to wholly or partially retract into the first end and second end, respectively of the internal wedge head or horizontal member 800.

FIG. 11 is a bottom, cutaway view of a pair of horizontal members 1101, 1111 with corresponding internal wedge heads 1102, 1112 on a rosette 600 showing an embodiment of the wedge assembly and crank/cam assembly of the invention. As seen therein, the crank/cam assembly 1104, 1114 comprise a pair of parallel, a positioned arms, each having a first segment and a second segment. Between the apositioned faces of the first segments of such pair of parallel arms, toward the distal ends thereof, is positioned the second ends of the first rods 1106A, 1116A. Between the apositioned faces of the second segments of the pair of parallel arms, toward the distal ends thereof, is positioned the second ends of the second rods 1106B, 1116B. Each of the second ends are rotatably coupled to their respective segments at a rotating joint comprising apertures through which a coupling component such as a bolt and nut, revolute, pin, rivet and associated washers, bushings and/or bearings and the like are used. The crank/cam arms seen in crank/cam assembly 1104, 1114 are rigidly coupled to a respective crank/cam axle, the arm segments of such crank/cam arms extending outwardly from the central axis of crank/cam axle. Each handle 1108, 1118 is fixedly coupled on the outside of horizontal member 1101, 1111 to a respective crank/cam axle of a crank/cam assembly 1104, 114, In this manner, the rotational motion of the handle 1108, 1118 rotates crank/cam axle, which rotation is translated, via the crank/cam arms into substantially linear motion of the first end of first rod 1106A, 1116A and first end (not shown) of second rod 1106B, 1116B. Hence, when the handle 1108, 1118 is turned in a first direction, it simultaneously causes the wedge portion 1107, 1117 of the first rod 1106A, 1116A and wedge portion (not shown) of the second rod 1106B, 1116B to each wholly or partially extend out of the first end and second end, respectively of the horizontal member 1101, 1111 and through the bore 1103, 1113 of internal wedge head 1102, 1112. When the handle 1108, 1118 is turned in an opposite direction, it simultaneously causes the wedge portion 1107, 1117 of the first rod 1106A, 1116A and wedge portion (not shown) of the second rod 1106B, 1116B to wholly or partially retract into the first end and second end, respectively of the internal wedge head 1102, 1112 positioned at the end of the respective horizontal member 1101, 1111.

FIG. 12A is a view of the back end of an internal wedge head 801 showing the wedge bore 806 through which a wedge portion (not shown) extends from the tubing of a horizontal member so as to lock the horizontal member into position with respect to the vertical member via the rosette. FIG. 12B is a top view of internal wedge head 801 showing a cylindrical extension 1201 that is dimensioned to fit within the interior wall of a hollow horizontal member. The internal wedge head 801 can then be bolted, welded, clamped or otherwise affixed to a horizontal member.

Figure 13:
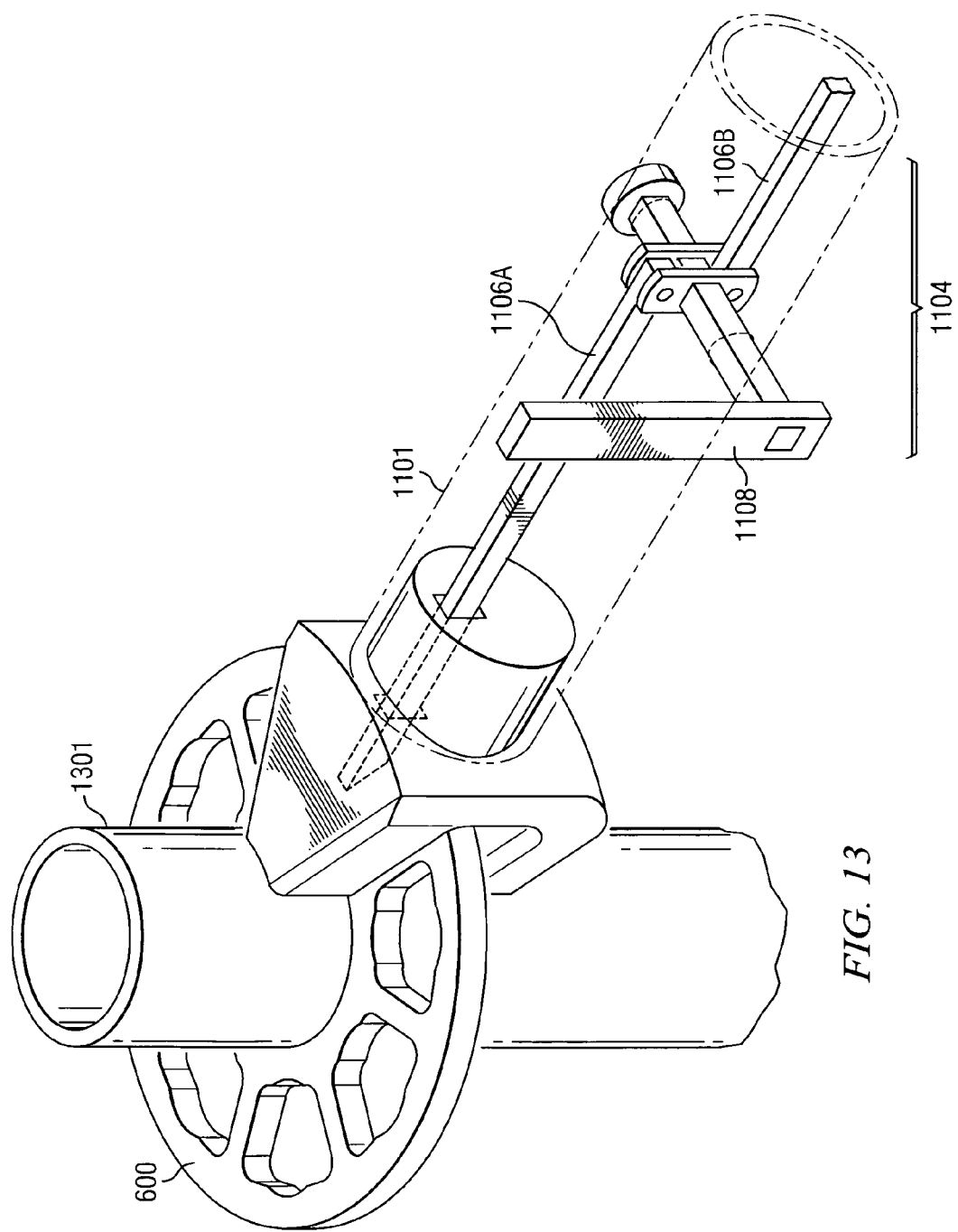
FIG. 13 is a perspective, cutaway view of a horizontal member and internal wedge head showing an embodiment of the wedge assembly and crank/cam assembly of the invention.

FIG. 13 is a perspective, cutaway view of a horizontal member 1101 and internal wedge head 1102 of FIG. 11 showing an embodiment of the wedge assembly and crank/cam assembly 1104 having handle 1108 which is responsively coupled, via a crank/cam axle and crank/cam arms to rod 1106A of the invention. As seen therein, horizontal member 1101 is coupled to vertical member 1301 via rosette 600, internal wedge head and the internal wedge assembly.

Figure 14:
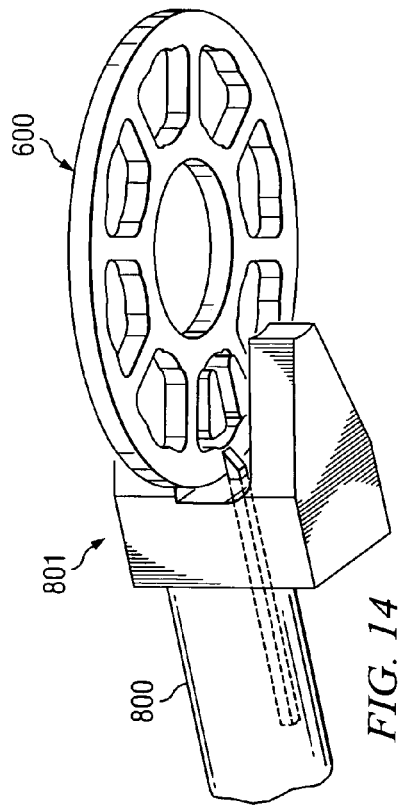
FIG. 14 is a side view of the horizontal member, internal wedge head and rosette of the invention.
Figure 15:
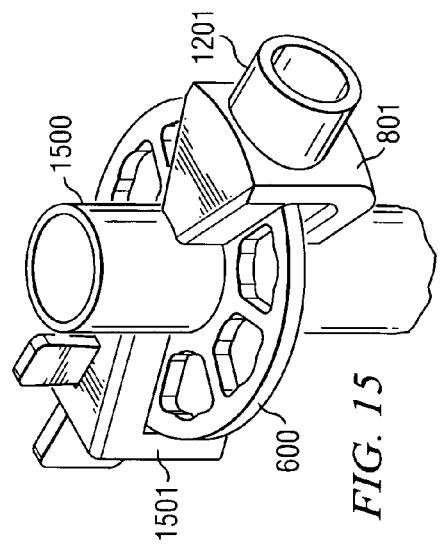
FIG. 15 is a perspective view of a rosette coupled to a portion of a vertical member with an internal wedge head of the invention and a conventional head/wedge coupled to the rosette.
Figure 16:
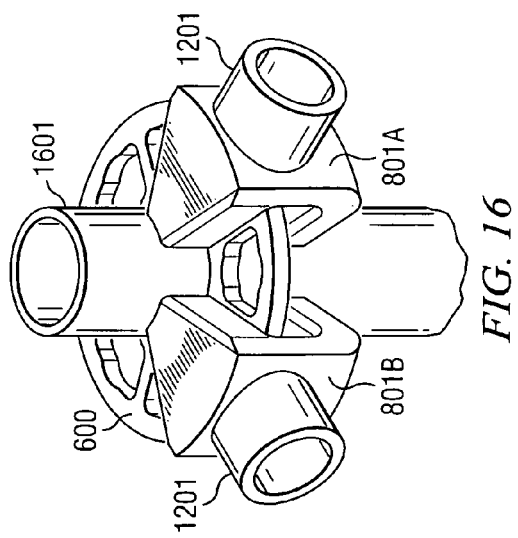
FIG. 16 is a perspective view of two internal wedge heads of the invention coupled at an angle to each other on a rosette.
Figure 17:
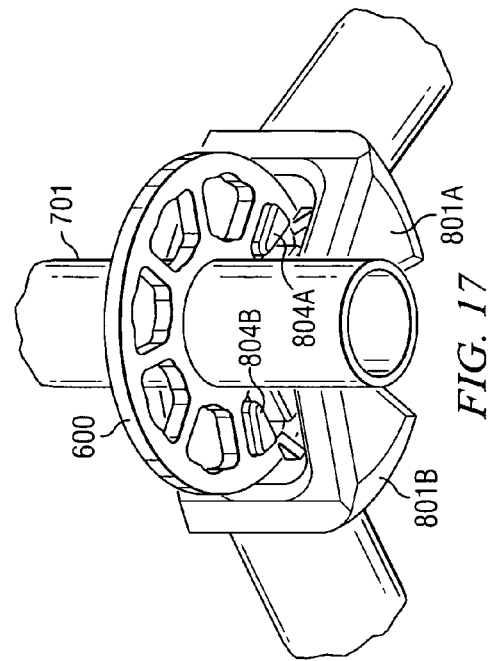
FIG. 17 is a bottom perspective view of two internal wedge heads of the invention coupled at a 90 degree angle to each other on a rosette.

FIG. 14 is a side view of the horizontal member 800 coupled to internal wedge head 801, which is coupled to rosette 600 of the invention. FIG. 15 is a perspective view of a rosette 600 coupled to a portion of a vertical member 1500 with an internal wedge head 801 of the invention and a conventional head/wedge 1501 coupled to the rosette 600. FIG. 16 is a perspective view of two internal wedge heads 801A, 801B of the invention coupled at an angle to each other on a rosette 600 which is fixedly attached to vertical tubing 1601 of a vertical member. FIG. 17 is a bottom perspective view of two internal wedge heads 801A, 801B wherein descending prongs 804A, 804B are received in respective radially arranged cut-outs 602 of rosette 600. Rosette 600 is fixedly attached, via welding or similar process, to vertical tubing 701 of the vertical member. The selection of the radially arranged cut-outs 602 in which to place prongs 804A, 804B as seen in FIG. 17 serve to position the horizontal members at a 90 degree angle with respect to each other. As seen therein, both extensions of the pair of prongs are located within a single radially arranged cut out. However, the gap between pairs of prongs is dimensioned to fit over the spoke between two adjacent pair of radially arranged cut-outs as seen with internal wedge head 1102 in FIG. 11. In this manner, up to 13 different angles can be obtained between a pair of horizontal members on a rosette having eight (8) radially arranged cut-outs (each internal wedge head possible in any one of sixteen (16) positions). Furthermore, using a rosette having eight (8) radially arranged cut-outs, up to eight (8) horizontal members can be placed on the shown rosette. Because the handle coupled to the crank/cam assembly is located toward one end of each horizontal member, a single installer can install and lock into place up to eight ends (8) of eight (8) horizontal members into a single vertical member substantially without changing the installer's position.

Figure 18:
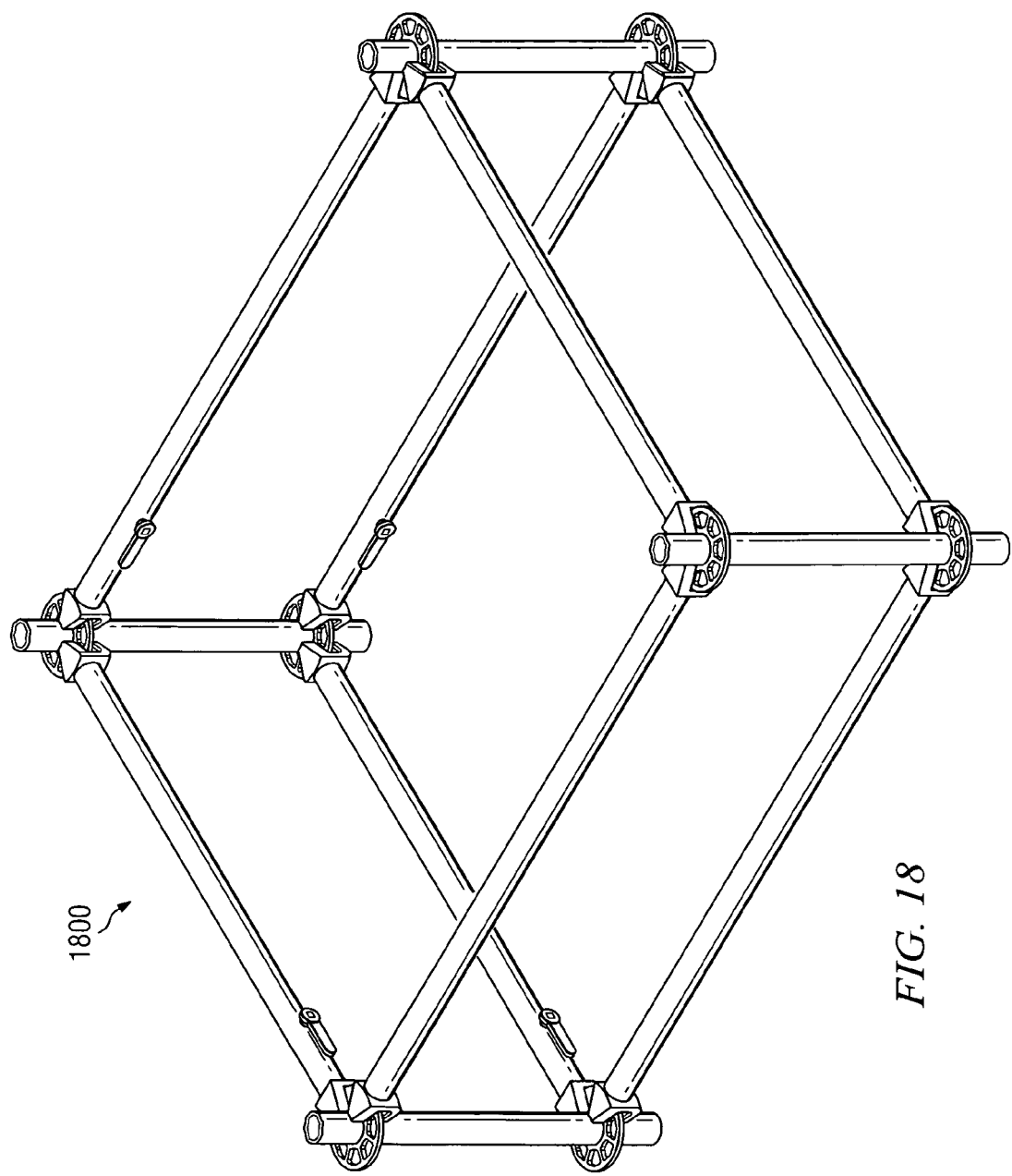
FIG. 18 is a perspective view of a cubic arrangement of the scaffold of the invention.
Figure 19:
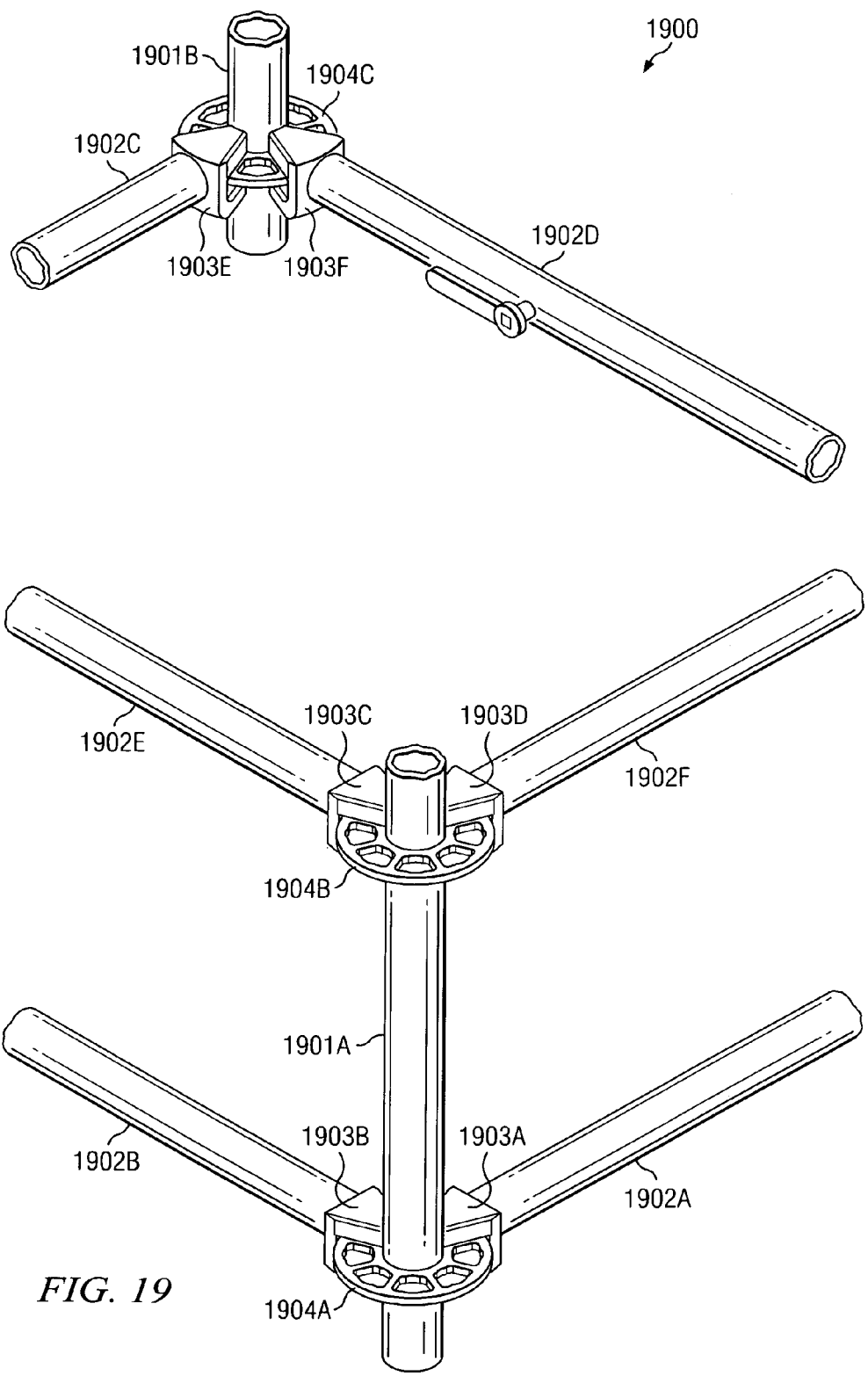
FIG. 19 is a close-up view of the corners of the cubic arrangement of FIG. 18.

FIG. 18 is a perspective view of a cubic arrangement of the scaffold 1800 of the invention showing eight horizontal members each having a first internal wedge head on a first end and a second internal wedge head on a second end, four vertical members (1 back vertical member hidden), each vertical member having fixedly attached thereon in coaxial alignment a first rosette and a second rosette, each internal wedge head being coupled to a rosette. FIG. 19 is a close-up view of the corners of the cubic arrangement of FIG. 18 showing six horizontal members 1902A-F, having internal wedge heads on the ends thereof 1903A-F, two vertical members 1901A-B, each vertical member having fixedly attached thereon at least one rosette 1904A-B, each shown internal wedge head being coupled to a rosette.

Figure 20:
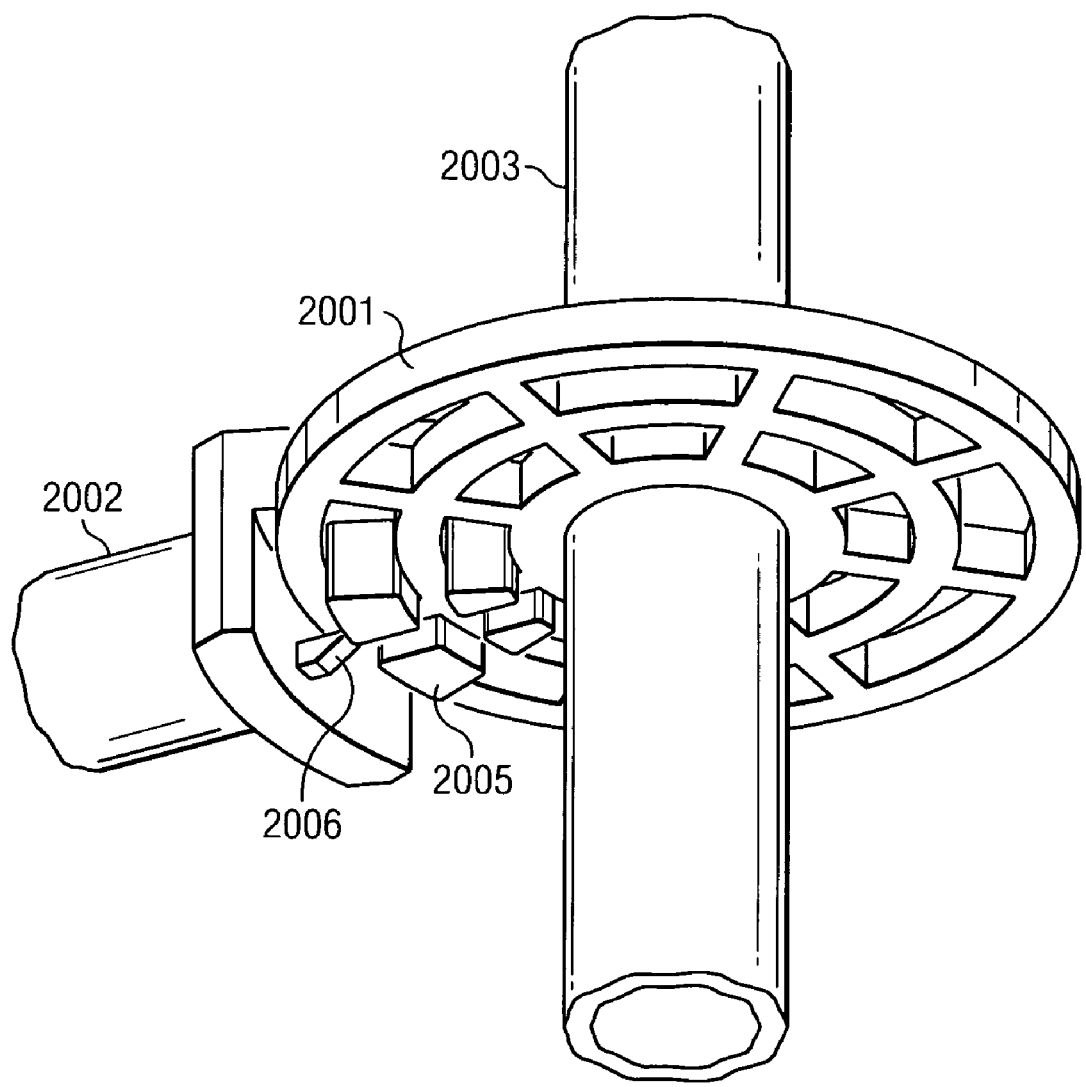
FIG. 20 is a second embodiment of an internal wedge head and rosette arrangement of the invention.

FIG. 20 is a second, alternative embodiment of an internal wedge head 2002 and rosette 2001 arrangement of the invention, wherein the internal wedge head includes four (4) descending prongs dimensioned to fit within either two (2) or four (4) corresponding radially arranged cut-outs of rosette 2001. The rosette 2001 of this embodiment thus has 16 radially arranged cut-outs. Rosette 2001 is fixedly coupled to vertical member 2003 and internal wedge head 2002 has a wedge bore through which wedge portion 2006 wholly or partially extends. Wedge portion 2006 is attached or integrated with a wedge assembly that includes a crank/cam assembly internal to a horizontal member as described herein.

The invention has at least one rosette attached, e.g., welded, to each vertical member, and a vertical member may have a plurality of evenly or unevenly spaced rosettes affixed, e.g., by weld, along a vertical member. The rosette has a pattern or grid of apertures designed to receive the mating elements, such as prongs at the end of a horizontal member. An internal wedge head may be located at the end of the horizontal member. The horizontal member is a hollow tube, preferably cylindrical in shape, having a first end and a second end. At the first end and the second end may be fixedly attached, an internal wedge head, as more fully described herein. Within the horizontal member of the invention is a wedge assembly.

The wedge assembly has a first rod section having a wedge portion at the first end thereof and a second rod section having a wedge portion at the first end thereof. The first rod section and second rod section are preferably made of steel, iron or other resilient material and can be treated by a process. The first rod section and second rod section can be equal, but they are preferably unequal in length. The second end of the first rod section and the second end of the second rod section each have an aperture there-through for receiving a coupler, such as a bolt and a nut, rivet, revolute, pin and associated washers, bushings and/or bearings, each coupler being coupled to a crank/cam assembly that is located between the first rod and the second rod. The couplers rotatably couple the second end of the first rod and the second end of the second rod together via the crank/cam assembly and one of the couplers, e.g., a bolt, extends out of the horizontal member orthogonally to the length of the horizontal member so as to receive a handle that responsively rotates the crank/cam axle and hence the first rod and the second rod. In this manner, the rotational motion of the crank/cam axle is translated to linear motion of the first rod and second rod. More specifically, the handle, when turned in a first direction, causes the wedge portion of the first rod and wedge portion of the second rod to wholly or partially extend out of the first end and second end, respectively from the internal wedge head and/or horizontal member. When the handle is turned in an opposite direction, it causes the wedge portion of the first rod and wedge portion of the second rod to wholly or partially retract into the first end and second end, respectively of the internal wedge head and/or horizontal member.

In an embodiment, at the end of each end of the horizontal member is an internal wedge head that may be a fixedly coupled separate component of the horizontal member or a single integrated part of the horizontal member. The internal wedge head has a bore there-through to receive the wedge portion of the respective rod. The internal wedge head further has a plurality of vertically descending prongs extending from the bottom facing surface of an extension thereof, the prongs of which are dimensioned to be positioned within the grid pattern of the rosette. When the internal wedge head is placed on the rosette, the face from which the prongs extend rests on portions of the rosette and the prongs extend through the grid apertures. On a face of the head orthogonal to the face on which the prongs extend, a wedge bore is provided to allow the wedge portion of a rod to be extended when the handle is turned, locking the internal wedge head, which is coupled to the horizontal member, to the rosette, which is coupled to the vertical member. Frictional force may be exerted between the wedge portion and a planar surface of the rosette to lock the position of the horizontal member to that of the vertical member.

Note that because the wedges of the invention are positioned within the hollow horizontal member and the prongs are integrated into the internal wedge head, which is fixedly coupled or integrated with the horizontal member, the scaffold of the invention remains rigid during construction and thereafter, and the risk of falling wedges or collapsing scaffolds is significantly reduced, if not eliminated.

In an embodiment of the invention, the design of the internal wedge head at each end of each horizontal member keeps scaffold components square and ridged at all times utilizing predetermined angles via the grid design. The scaffold design of the invention reduces leading edge fall hazards associated with conventional scaffold systems. The scaffold design of the invention also reduces the need for hand tools during the installation and dismantling of horizontal members. Advantageously, the scaffold design of the invention reduces the amount of labor and time needed to install and dismantle a scaffold system.

The invention components can be fabricated from a variety of materials, including galvanized or powder coated steel, iron or other resilient material. The rosette preferably has a seven inch (7") diameter, and the internal first and second rods can comprise two square, or cylindrical rods, made of e.g., steel or iron, each having a wedge shaped wedge portion added or integrated at an end, the opposite ends being coupled to the crank/cam assembly. The wedge portion preferably comprises a piece of hard material with two principal faces meeting in a sharply acute angle. The wedge portions lock the horizontal members into the vertical members via the rosette creating a joint. The two (2) internal rods are each coupled at a revolution joint. An embodiment of each revolution joint comprises two (2) washers and two (2) bolts. The rods are bolted together using a crank/cam assembly. The rods thus oscillate internally of the tube and lock under the rosette, thus locking the horizontal member preventing uplift. In this manner, the ends of the horizontal member lock into the vertical member. Using the grid pattern of apertures on the rosette and head having prongs dimensioned to fit therein, various angles between the horizontal members can be obtained (e.g., 45, 90, 180 degrees) for the elevated working platform.

Advantageously, the invention allows the erector to engage and disengage both internal wedge portions of a single horizontal member from a single point reducing installation time and creating a safer work environment. This is because the single handle between the first end and the second end of the horizontal member engages and disengages each wedge substantially simultaneously. In this manner, up to eight (8) horizontal members can be attached to a single vertical member by a single installer without changing his position.

The invention further comprises a grid of components that mesh together creating rigid angled connection among a plurality of horizontal members at a vertical member. Both of the wedges which are part of an internal wedge assembly, are locked into position at the rosette on a vertical member from a single position. The internal wedge portions are locked into place by an external handle eliminating the use of any hand tools. The external handle can also be locked into place creating a secondary locking device.

The embodiments shown and described above are only exemplary. Even though numerous characteristics and advantages of embodiments of the invention have been set forth in the foregoing description together with details of the invention, the disclosure is illustrative only and changes may be made within the principles of the invention to the full extent indicated by the broad general meaning of the terms used herein. For example, the concepts described herein for coupling horizontal members to vertical members can be used to couple bracing members to vertical members or to horizontal members. Coupling includes, but is not limited to attaching, engaging, mounting, clamping, welding, bolting and components used for coupling include bolts and nuts, rivets, clevis, latches, clamps, welds, screws, rivets and the like. Further, a rosette having eight (8) radially arranged cut-outs is described herein for illustrative purposes and a rosette having more or less radially arranged cut-outs is considered to be within the scope of this invention. Also, the invention describes a rosette having a standard diameter of about seven (7) inches, however, any suitable diameter can be used. The use of an internal wedge head with a pair, or an internal wedge head with two pair, of descending vertical prongs is described herein for illustrative purposes and an internal wedge head having one or more descending prongs is considered within the scope of this invention. The rosette can include any suitable cut-out shape that is dimensioned to receive a corresponding prong or set of prongs of an internal wedge head. The vertical member can have any number of coaxially aligned rosettes attached thereto, the vertical spacing of such rosettes being any such distance as is suitable for the intended use. More generally, the invention is a scaffold system with a horizontal member, a vertical member at least one rosette affixed in coaxial alignment to the vertical member and an internal wedge assembly within the a horizontal member, portions of the internal wedge assembly for locking the horizontal member to the rosette. The vertical member has a plurality of evenly spaced rosettes affixed in coaxial alignment along the vertical member and at least one rosette has a pattern or grid of apertures designed to receive the end of the horizontal member. The scaffold system can also have a wedge head coupled to one end of the horizontal member and a handle coupled to the internal wedge assembly. Each wedge head has prongs extending therefrom, the prongs dimensioned to fit within the grid of apertures of the rosette. The internal wedge assembly can include a linkage, the handle being responsively coupled to a first portion of a linkage of the internal wedge assembly and the wedge being coupled to a second portion of the linkage; and a rod, the first end thereof coupled at a third portion of the linkage, the second end of the rod coupled to a second wedge for extension and retraction at the distal end of the horizontal member. The internal wedge assembly can further comprise a linkage mechanism. with the internal wedge assembly having a first rod section having a wedge portion at the first end thereof and a second rod section having a wedge portion at the first end thereof, wherein the second end of the first rod section and the second end of the second rod section are each rotatably coupled to the linkage mechanism. The first rod section and second rod section can be unequal in length. In addition to rods, cables and similar components for transferring motion can be used to transfer the motion of the handle to the extension and retraction of the wedges. The internal wedge assembly can further use a crank/cam assembly, the crank/cam assembly having a first rod section with a wedge portion at the first end thereof and a second rod section with a wedge portion at the first end thereof, wherein the second end of the first rod section and the second end of the second rod section are each rotatably coupled to the crank/cam assembly. The handle is then coupled to the crank/cam assembly, which, when actuated causes the wedge portion of the first rod and wedge portion of the second rod to partially or wholly extend or retract out of the first end and second end, respectively from the horizontal member, depending on the direction that the handle is turned. The first rod section and the second end of the second rod section can, in an aspect of the invention, each have an aperture there-through each for receiving a coupler forming a rotation joint, each coupler being coupled to a crank/cam assembly positioned between the second end of the first rod and the second end of the second rod. The external handle can be coupled to the crank/cam assembly, wherein when the handle is turned, causes the wedge portion of the first rod and wedge portion of the second rod to wholly or partially extend or retract out of the first end and second end, respectively from the horizontal member.

I claim:

1. A scaffold system, comprising:
a horizontal member,
a first vertical member having at least one rosette affixed in coaxial alignment to the first vertical member; and
an internal wedge assembly within the horizontal member, portions of the internal wedge assembly for locking the horizontal member to the at least one rosette,
a first wedge head coupled to a first end of the horizontal member;
a handle;
the internal wedge assembly further comprising a linkage mechanism, the handle being responsively coupled to the linkage mechanism; and
a first rod section, the second end thereof coupled to the linkage mechanism, the first end of the first rod section having a wedge portion for extension and retraction at the first wedge head coupled to the first end of the horizontal member.

2. The scaffold system of claim 1, further comprising:
a second wedge head coupled to a second end of the horizontal member to be received at a second vertical member having at least one rosette affixed in coaxial alignment to the second vertical member; and;
a second rod section having a wedge portion at the first end thereof for extension and retraction at the second wedge head coupled to the second end of the horizontal member,
wherein the second end of the first rod section and the second end of the second rod section are each rotatably coupled to the linkage mechanism.

3. The scaffold system of claim 2, wherein the first rod section and second rod section are unequal in length.

4. The scaffold system of claim 2, the linkage mechanism comprising a crank/cam assembly wherein the second end of the first rod section and the second end of the second rod section are each rotatably coupled to the crank/cam assembly; and
wherein the handle is coupled to the crank/cam assembly, which, when actuated causes the wedge portion of the first rod section and wedge portion of the second rod section to partially or wholly extend or retract through their respective wedge head, and out of the first end and second end, respectively from the horizontal member, depending on the direction that the handle is turned.

5. The scaffold system of claim 4, wherein the second end of the first rod section and the second end of the second rod section each have an aperture there-through for receiving a coupler forming a rotation joint, each coupler being coupled to the crank/cam assembly.

6. The scaffold system of claim 5, wherein each wedge head has prongs extending therefrom, the prongs dimensioned to fit within a grid of apertures of the rosette.

7. The scaffold system of claim 6, further comprising the first and second wedge heads fixedly attached to their respective ends of the horizontal member, each wedge head having a bore therethrough for receiving the wedge portion.

* * * * *